United States Patent [19]

Courtoy et al.

[11] E Patent Number: Re. 33,069

[45] Reissued Date of Patent: Sep. 26, 1989

[54] PROCESS FOR OBTAINING AREAS OF DISTINCTIVE APPEARANCE ON SYNTHETIC COVERINGS AND THE PRODUCT DERIVED THEREFROM

[75] Inventors: Jean-Francois Courtoy, Wiltz; Daniel Marchal, Esch sur Alzette, both of Luxembourg

[73] Assignee: Eurofloor S.A., Luxembourg

[21] Appl. No.: 96,348

[22] Filed: Sep. 11, 1987

Related U.S. Patent Documents

Reissue of:

[64] Patent No.: 4,617,222
Issued: Oct. 14, 1986
Appl. No.: 603,842
Filed: Apr. 25, 1984

[30] Foreign Application Priority Data

Apr. 25, 1983 [LU] Luxembourg ..... 84766
Aug. 11, 1983 [LU] Luxembourg ..... 84957

[51] Int. Cl.[4] ..... B05D 3/06

[52] U.S. Cl. ..... 428/142; 427/44; 427/54.1

[58] Field of Search ..... 427/43.1, 44, 53.1, 427/54.1, 261, 262, 264; 428/141, 142, 152

[56] References Cited

U.S. PATENT DOCUMENTS

| | | | |
|---|---|---|---|
| 3,310,422 | 3/1967 | Petry | 427/264 |
| 4,029,831 | 6/1977 | Daunheimer | 427/264 |
| 4,068,030 | 1/1978 | Witman | 428/159 |
| 4,172,169 | 10/1979 | Mawson et al. | 427/262 |
| 4,187,131 | 2/1980 | Shortway et al. | 427/264 |
| 4,273,819 | 6/1981 | Schmidle et al. | 427/264 |
| 4,491,616 | 1/1985 | Schmidle et al. | 427/44 |

FOREIGN PATENT DOCUMENTS

| | | |
|---|---|---|
| 1061259 | 11/1953 | France . |
| 1538506 | 7/1968 | France . |
| 2235796 | 1/1975 | France . |
| 1159685 | 7/1969 | United Kingdom . |

*Primary Examiner*—Norman Morganstern
*Assistant Examiner*—Marianne L. Padgett
*Attorney, Agent, or Firm*—Fishman, Dionne & Cantor

[57] ABSTRACT

A process and product is presented for obtaining selective areas of distinctive appearance, i.e., matting on synthetic coverings. The process includes, depositing a polymeric coating which contains at least one radiation initiator for polymerization onto at least a first selected area or zone on an expandable or non-expandable support substrate. Next, at least one second coating comprised of a crosslinkable monomer is deposited onto a second selected area on the substrate. This second area or zone may encompass at least a portion of the first area. Thereafter, pre-gelling is performed on the deposited material followed by a graining operation which is carried out over at least a portion of the substrate surface. The synthetic covering in the first zone or area is then polymerized by radiation initiation wherein the particular appearance thereof is fixed to the substrate. Thereafter, gelling is carried out wherein the polymer which has not been fixed by radiation initiation will flow, i.e., fluidize, such that the grained appearance in the second area or zone will disappear, i.e., smooth over. This gelling may also cause some expansion of the polymer on the substrate.

41 Claims, 1 Drawing Sheet

PROCESS FOR OBTAINING AREAS OF DISTINCTIVE APPEARANCE ON SYNTHETIC COVERINGS AND THE PRODUCT DERIVED THEREFROM

Matter enclosed in heavy brackets [ ] appears in the original patent but forms no part of this reissue specification; matter printed in italics indicates the additions made by reissue.

*This application is a reissue of 06/603,842 filed Apr. 25, 1984 now U.S. Pat. No. 4,617,222.*

BACKGROUND OF THE INVENTION

This invention relates to the field of synthetic coverings. More particularly, this invention relates to a process for manufacturing synthetic coverings and the products obtained thereby. The process of the present invention is particularly well suited for providing selected areas of distinctive appearance, i.e., matting or graining, on a synthetic covering surface, particularly floor or wall coverings which are based on synthetic materials, usually polyvinyl chloride (PVC). The present invention is related to U.S. patent application Ser. No. 603,843,756 filed on the same day as this application, assigned to the assignee hereof and incorporated herein by reference.

The majority of synthetic plastic coverings do not exhibit a sufficient visual difference between glossy areas and matted or grained areas on the surface thereof. A distinct difference between gloss and mattness is desirable on synthetic coverings in order to provide certain distinctive appearances. For example, certain areas on the surface covering may have a design applied by printing or other means, while other areas may have a joint imitation thereon. This is particularly true when a synthetic covering is intended to imitate a ceramic tile flooring. Accordingly, an important feature for many types of synthetic coverings is that selected areas or zones on the surface thereof have a distinctive visual appearance, especially between glossy areas and matted areas.

In U.S. Pat. No. 4,273,819, matting of the joint between the tiles of a ceramic tile imitation is provided by the addition of a vinyl monomer and a thermal initiator to the entire surface layer followed by hot graining of this surface. The decorative printed areas contain a catalyst which lowers the decomposition temperature of the thermal initiator so that those areas retain a matted (grained) appearance. Conversely, other zones not containing this catalyst will lose their grained appearance during subsequent gelling. The process of U.S. Pat. No. 4,273,819 has certain disadvantages. For example, the process is highly dependent on the graining temperature. Thus, if the temperature is only slightly higher than required, there is a danger of initiating a crosslinking reaction over the entire surface of the synthetic covering and, thereby, achieving an undesirable matted appearance over the entire surface thereof. Conversely, too low a graining temperature will not provide the desired matted appearance even on those portions where the matted appearance is desired, i.e., at the joints. Moreover, in view of the kinetics of the decomposition of the initiator, too long a graining time, even at the correct temperature, presents the same danger as when using too high a graining temperature, i.e., complete graining or matting.

Another prior art technique which is similar to that process described in U.S. Pat. No. 4,273,819 and which also makes it possible to obtain distinctive matted and glossy surface effects is described in FR-A-2,531,009. As in the U.S. Patent, the French Patent suffers from similar deficiencies and drawbacks.

SUMMARY OF THE INVENTION

The above-discussed and other problems of the prior art are overcome or alleviated by the process and product of the present invention. In accordance with the present invention, a novel process is provided for obtaining selective areas or zones of distinctive appearance, i.e., matting or graining on a synthetic covering surface which is not dependent on either the graining or gelling temperatures and which is independent of the graining reaction time.

In accordance with the present invention, this improved process includes, depositing a polymeric coating which contains at least one radiation initiator for polymerization onto at least a first selected area or zone on an expandable or non-expandable support substrate. Next, at least one second coating comprised of a crosslinkable monomer is deposited onto a second selected area on the substrate. This second area or zone may encompass at least a portion of the first area. Thereafter, pre-gelling is performed on the deposited material followed by a graining operation which is carried out over at least a portion of the substrate surface. The synthetic covering in the first zone or area is then polymerized by radiation initiation wherein the particular appearance thereof is fixed to the substrate. Thereafter, gelling is carried out wherein the polymer which has not been fixed by radiation initiation will flow, i.e., fluidize such that the grained appearance in the second area or zone will disappear, i.e., smooth over. This gelling may also cause some expansion of the polymer on the substrate.

It should be appreciated that "radiation initiator" may be any suitable initiator which is decomposed or modified by energy radiation, for example, by ultraviolet rays, to form free radicals or ions which are required for chain propogation in a polymerization reaction.

In a preferred embodiment of the present invention, an ink or extender containing an ultraviolet polymerization initiator is deposited on an expandable or non-expandable substrate in at least the first zone described above. This preferred embodiment makes it possible to initiate polymerization at localized or selected areas. In other words, the polymerization reaction can be localized to those areas where the ultraviolet initiator has been deposited, this reaction taking place after graining so as to rigidify the surface of the first zone and retain the matted (grained) appearance of this surface during subsequent operations.

An important feature of the process and product of the present invention is that the entire surface of the synthetic covering may be grained without necessitating a special graining roller controlled in accordance with the design or decoration of the covering to be utilized. This is because the zone which is not polymerized after graining will be fluidized during the subsequent gelling treatment and will become smooth through surface tension.

The above discussed and other advantages of the present invention will be apparent to and understood by those skilled in the art from the following detailed description and drawings.

BRIEF DISCUSSION OF THE DRAWINGS

Referring now to the drawings wherein like elements are numbered alike in several figures.

DESCRIPTION OF THE PREFERRED EMBODIMENT

Figure 1:
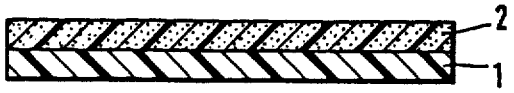
FIG. 1 is a cross-sectional elevation view of a substrate material used in accordance with the process and product of the present invention.

The present invention provides a novel process for obtaining selective areas or zones of distinctive appearance, i.e., matting or graining on a synthetic covering surface. In accordance with the present invention, this improved process includes, depositing a polymeric coating which contains at least one radiation initiator for polymerization onto at least a first selected area or zone on an expandable or non-expandable support substrate. Next, at least one second coating comprised of a crosslinkable monomer is deposited onto a second selected area on the substrate. This second area or zone may encompass at least a portion of the first area. Thereafter, pre-gelling is performed on the deposited material followed by a graining operation which is carried out over at least a portion of the substrate surface. The synthetic covering in the first zone or area is then polymerized by radiation initiation wherein the particular appearance thereof is fixed to the substrate. Thereafter, gelling is carried out wherein the polymer which has not been fixed by radiation initiation will flow, i.e., fluidize, such that the grained appearance in the second area or zone will disappear, i.e., smooth over. This gelling may also cause some expansion of the polymer on the substrate.

It should be appreciated that "radiation initiator" may be any suitable initiator which is decomposed or modified by energy radiation, for example, by ultraviolet rays, to form free radicals or ions which are required for a chain propogation in a polymerization reaction.

In a preferred embodiment of the present invention, an ink or extender containing an ultraviolet polymerization initiator is deposited on an expandable or non-expandable substrate in at least the first zone described above. This preferred embodiment makes it possible to initiate polymerization at localized or selected areas. In other words, the polymerization reaction can be localized to those areas where the ultraviolet initiator has been deposited, this reaction taking place after graining so as to rigidify the surface of the first zone and retain the matted (grained) appearance of this surface during subsequent operations.

By way of example only, crosslinkable monomers suitable for use in connection with the present invention include, but are not limited to, the following compounds: ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene diacrylate, polyethylene glycol dimethacrylate, polyethylene glycol diacrylate, 1,3-butylene glycol dimethacrylate, 1,4-butylene glycol dimethacrylate, 1,3-butylene glycol diacrylate, 1,4-butylene glycol diacrylate, 1,6-hexanediol dimethacrylate, 1,6-hexanediol diacrylate, neopentyl glycol diacrylate, neopentyl glycol dimethacrylate, (ethoxylated) bis-phenol A dimethacrylate, divinylbenzene, divinyltoluene, trimethylolpropane trimethacrylate, trimethylolpropane triacrylate, pentaerythritol triacrylate, glyceryl trimethacrylate, pentaerythritol tetracrylate and pentaerythritol tetramethacrylate. It will be appreciated that particularly preferred compounds are 1,4-butylene glycol dimethacrylate and trimethylolpropane trimethacrylate (Example 2).

Besides the above listed monomer compounds, which all have at least two propagation sites, monomeric compounds possessing only one propagation site may be added thereto. The coating containing the crosslinkable monomer should contain 1 to 50%, preferably about 11%, by weight of monomer possessing at least two chain propagation sites, optionally mixed with monomers possessing one chain propagation site.

In the case where the matt effect is desired in the joint area of a covering so as to imitate ceramic tiling, the ink containing the radiation initiator can also contain an expansion inhibitor. Conversely, in the case where the matt effect is desired in the area of a design applied onto an expanded zone, the ink or extender obviously will not contain an expansion inhibitor. It will be appreciated that conventional expansion inhibitors, preferably trimellitic anhydride (TMA) may be utilized by the present invention.

Preferable ultraviolet polymerization initiators include DAROCUR®1173 (2-hydroxy-2-methyl-1-phenyl-propan-1-on) or DAROCUR®1116 (1-(4-isopropylphenyl)-2hydroxy-2-methyl-propan-1-on) manufactured by Merck in amounts of from 1 to 50%, preferably 20%, by weight of the ink or of the extender. Other compounds include, but are not limited to, the following: benzophenone, 2-chloro-thioxanthone, 2-methylthioxanthone, 2-isopropyl-thioxanthone, benzoin, 4,4'-dimethoxybenzoin, benzoin ethyl ether, benzoin isopropyl ether, benzyldimethylketal, 1,1,1-trichloroacetophenone, 1-phenyl-1,2-propanedione-2-(ethoxycarbonyl)-oxime, diethoxyacetophenone, dibenzosuberone, DAROCUR®1398 1-(3,4-dimethylbutyl)-2-hydroxy-2-methyl-propan-1-on), DAROCUR®1174 (1-(4-chlorobutyl)-2-hydroxy-2-methyl-propan-1-on) and DAROCUR®1020 (1-(4-tertiobutyl)-2-hydroxy-2-methyl-propan-1-on). It should be understood that at least two different radiation initiators, in the same zone or in different zones and different layers, may also be used in conjunction with the process of the present invention.

Figure 6:
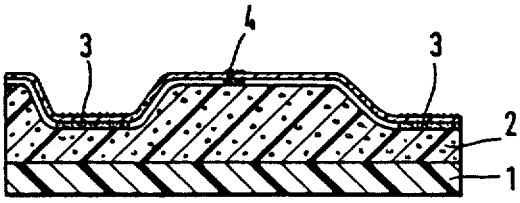
FIG. 6 is a cross-sectional elevation view of the final product provided in accordance with the process of the present invention.

In accordance with one embodiment of the present invention, the synthetic covering may be smoothed by surface tension which is provided during gelling, either by utilizing a mechanical smoothing treatment with a roller or by carrying out a preferably slight hot graining operation. It will be appreciated that another way of accomplishing the smoothing operation is to expose the final synthetic covering (for example, when the final product leaves an expansion oven), to infrared radiation so as to assist the smoothing operation of the product surface (as shown in FIG. 6 and discussed in Example 1).

In an alternative embodiment of the present invention, the method of producing a floor or wall covering is facilitated by polymerizing the monomer at selected intervals. In the alternative embodiment, the second zone may be directly initiated or indirectly initiated by using an agent for energy transfer by radiation, so that each of the initiation stages is triggered by a specific physiochemical condition. In this manner, it is possible to separate the polymerization initiation in the selected zones in accordance with the initiators and/or physiochemical initiation properties. It will be appreciated that the polymerization initiation energy provided by radiation in a first zone should not initiate the polymerization of a second or other zone. This above-described separation of the initiation conditions thus make it possible to polymerize one selected zone and fix its particular appearance and subsequently to polymerize a second zone without deterioration of the appearance of the first zone. Preferably, the initiation of the polymerization of the second zone is by direct radiation or via an energy transfer agent which may be effected by X-rays, an electron beam or gamma radiation. In order for the energy transfer agent to be able to exert its full effects, the energy transfer agent must act on a covering product in which sufficient mobility of the crosslinkable monomer is assured. This condition is best effected by heating the synthetic covering in an oven, preferably the oven wherein the gelling and/or optional expansion steps are carried out. Alternatively, the energy transfer agent may act on the covering product upon leaving this oven, i.e., while the product is still at a sufficiently high temperature.

In accordance with the above-described embodiment, the polymerization in the first zone can be achieved by the techniques described below in the Examples while the polymerization in the second zone can be provided by suitable physiochemical means. Moreover, the polymerization of the second zone can be done without major modifications to production lines for existing floor coverings. It will be appreciated that the monomers to be used, the localized application techniques in the various zones, and, in general, the overall technological process described above is identical, mutatis mutandis, to that which is described below in the Examples.

It should be understood that the method used for effecting initiation in the second zone by radiation means if, for example, trimethylolpropane trimethacrylate is used as the monomer, is fully described by Salmon and Loan, J. Appl. Polym. Sci., 16, 671 (1972).

When electron beams are used in accordance with the present invention to initiate the polymerization reaction, a preferred apparatus is the ELECTROCURTAIN apparatus manufactured by Ateliers de Charmilles (Energy Sciences International) of Geneva (Switzerland), using sufficient energy to penetrate into the proper depth of the layer which is to be crosslinked, for example, energy on the order of 175 KV for doses of 2 Mrads have been found sufficient.

It will be appreciated that the process of matting in accordance with the present invention may also be applied to relief products produced by silk-screen techniques.

The following two examples are provided to show preferred embodiments of the process and product of the present invention:

EXAMPLE 1

Figure 2:
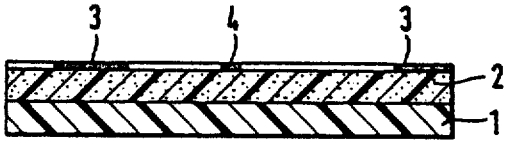
FIG. 2 is a cross-sectional elevation view showing the first step in the process of the present invention.

Referring first to FIG. 1, the support of the synthetic covering preferably consists of a substrate 1 having a coating, in an amount of 500 g/m$^2$, of an expandable or foamable plastisol 2. On this expandable plastisol coating 2, a conventional ink containing an expansion inhibitor and about 20% of the ultraviolet initiator DAROCUR ®1173 or 1116 is deposited in a first selected area or zone in one or more stages in accordance with the decoration which is an imitation of a tiled joint design 3 (see FIG. 2). An ink containing an ultraviolet initiator is also deposited in accordance with any desired decorative design 4. It will be appreciated that the ink can be replaced by an extender (i.e., a solution without dye stuff or pigment) depending upon the desired decorative effect to be obtained. Preferably, this deposition (of ink or extender) is effected by a photogravure or silk screen technique.

Figure 3:
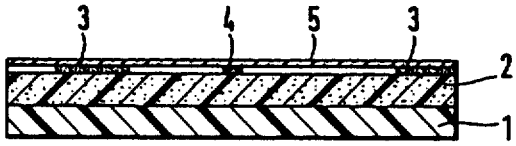
FIG. 3 is a cross-sectional elevation view showing a second step in the process of the present invention wherein a covering has been provided after the second zone has been coated on the substrate.

Referring now to FIG. 3, thereafter, a transparent plastisol coating is deposited over the entire surface to serve as a wear layer 5. This wear layer 5 coating contains an acrylic monomer ROCRYL ®980 or some other monomer compatible with the chosen initiator. Next, pre-gelling is carried out at the convention pre-gelling temperature which is usually between about 100° C. and 160° C.

Figure 4:
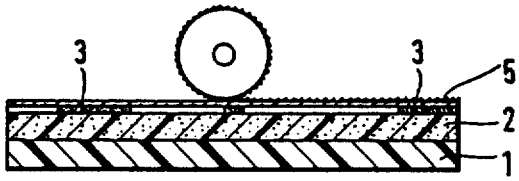
FIG. 4 is a cross-sectional elevation view of a third step in the process of the present invention indicating the graining operation.
Figure 5:
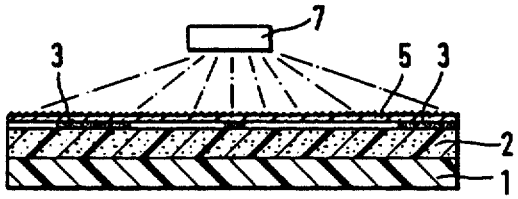
FIG. 5 is a cross-sectional elevation view of a fourth step in the process of the present invention showing polymerization via a radiation initiator.

In FIG. 4, the step of graining the entire surface by means of a graining roll under a pressure which depends upon the degree of mattness desired is shown. This graining step is usually conducted at a conventional temperature which is somewhere below 100° C. It will be appreciated that the pre-gelling and graining stages can be carried out in a single step using a sufficiently heated graining roll. Referring now to FIG. 5, the synthetic covering is passed under an ultraviolet lamp 7 wherein the zone of material containing the ultraviolet initiator is crosslinked so that the grained or matted appearance of this zone is fixed thereby.

Thereafter, the synthetic covering product obtained therefrom is passed for between 1-2 minutes 30 seconds through an oven of about 200° C. wherein the expandable coating 2 is expanded into the areas which do not contain an expansion inhibitor as well as to gel and fluidize the zone which has not been polymerized during the ultraviolet initiation. As a result, the heat from the oven will cause fluidization which has the effect of smoothing the grained surface, while the zone which has been grained and crosslinked during the ultraviolet initiation retains its grained, i.e., matted, appearance. The resultant final product is shown in FIG. 6.

EXAMPLE 2

The same procedure as used in Example 1 is followed in this Example, the PVC being replaced by a copolymer of vinyl chloride (95%) and vinyl acetate (5%), all the other components remaining as before.

The following composition was used:

| | Parts by weight |
|---|---|
| VC/VA copolymer resin containing 5% of vinyl acetate | 100.00 |
| Stabilizer (barium/zinc) | 3.00 |
| Monomer (trimethylolpropane | 20.00 |

-continued

| | Parts by weight |
|---|---|
| trimethacrylate) | |
| Plasticizers | 57.00 |
| Deaerating agent | 3.3 |

The pre-gelling is preferably carried out on a drum at 130° C.; although this temperature can be exceeded, depending upon the speed of travel of the covering product. It has been found that the above composition provides better gelling and smoothing.

While preferred embodiments have been shown and described, various modificatons and substitutions may be made thereto without departing from the spirit and scope of the invention. Accordingly, it is to be understood that the present invention has been described by way of illustrations and not limitation.

What is claimed is:

1. A process of obtaining areas of distinctive appearance on a synthetic covering, the covering including a support layer, including the steps of:

depositing at least a first polymeric coating having at least one radiation initiator therein onto a first selected [area] *zone* of said support layer;

depositing at least a second [polymeric] coating onto a second selected [area] *zone* of said support layer, at least a portion of said second [polymeric] coating comprising a crosslinkable monomer, *said deposited coatings defining a synthetic covering;* pre-gelling said [deposited coatings] *synthetic covering;* mechanically graining *at least* selected areas of said [deposited coatings] *synthetic covering* to form a matted surface;

polymerizing said [first polymeric coating] *synthetic covering in said first zone* via said radiation initiator wherein said [first polymeric coating] *synthetic covering in said first zone* is fixed to said support layer, and wherein said matted surface on said [first polymeric coating] *synthetic covering in said first zone* is fixed thereon; and gelling [said second polymeric coating] to cause fluidization of said [second polymeric coating] *synthetic covering which has not been fixed by initiation in said first zone* thereby smoothing said matted surface thereon.

2. The process of claim 1 wherein said support layer is non-expandable.

3. The process of claim 1 wherein said support layer is expandable.

4. The process of claim 3 including:

expanding said support layer during gelling.

5. The process of claim 1 including:

depositing said second polymeric coating over at least a portion of said first polymeric coating.

6. The process of claim 1 wherein:

said radiation initiator is an ultraviolet polymerization initiator.

7. The process of claim [6] *1* wherein:

said [ultraviolet initiator is in the form of] *first coating comprises* an ink or an extender.

8. The process of claim 6 wherein said ultraviolet initiator is at least one of the initiators selected from the group consisting of:

benzophenone, 2-chloro-thioxanthone, 2-methyl-thioxanthone, 2-isopropyl-thioxanthone, benzoin, 4,4'-dimethoxybenzoin, benzoin ethyl ether, benzoin isopropyl ether, benzyldimethylketal, 1,1,1-trichloro-acetophenone, 1-phenyl-1,2-propanedione-2-(ethoxycarbonyl)-oxime, diethoxyacetophenone, dibenzosuberone, DAROCUR®1398, (1-(3,4-dimethylbutyl)-2-hydroxy-2-methyl-propan-1-on), DAROCUR®1174, (1-(4-chlorobutyl)-2-hydroxy-2-methyl-propan-1-on), DAROCUR®1020 (1-(4-tertiobutyl)-2-hydroxy-2-methyl-propan-1-on), DAROCUR®1116 (1-(4-isopropylphenyl)-2-hydroxy-2-methyl-propan-1-on) and DAROCUR®1173 (2-hydroxy-2-methyl-1-phenyl-propan-1-on).

9. The process of claim 7 wherein:

said ink or extender comprises between about 1 to about 50 weight percent of ultraviolet initiator.

10. The process of claim 1 wherein:

at least one of said first and second polymeric coatings is provided with an expansion inhibitor.

11. The process of claim 10 wherein:

said expansion inhibitor is trimellitic anhydride.

12. The process of claim 1 wherein:

said crosslinkable monomer is a monomer having at least two propagation sites.

13. The process of claim 12 wherein said crosslinkable monomer is at least one of the monomers selected from the group consisting of:

ethylene glycol dimethacrylate, ethylene glycol diacrylate, diethylene glycol dimethacrylate, diethylene glycol diacrylate, triethylene glycol dimethacrylate, triethylene glycol diacrylate, tetraethylene glycol dimethacrylate, tetraethylene diacrylate, polyethylene glycol dimethacrylate, polyethylene glycol diacrylate, 1,3-butylene glycol dimethacrylate, 1,4-butylene glycol dimethacrylate, 1,3-butylene glycol diacrylate, 1,4-butylene glycol diacrylate, 1,6-hexanediol dimethacrylate, 1,6-hexanediol diacrylate, neopentyl glycol diacrylate, neopentyl glycol dimethacrylate, (ethoxylated) bis-phenol A dimethacrylate, divinylbenzene, divinyltoluene, trimethylolpropane trimethacrylate, trimethylolpropane triacrylate, pentaerythritol triacrylate, glyceryl trimethacrylate, pentaerythritol tetracrylate and pentaerythritol tetramethacrylate.

14. The process of claim 12 wherein:

said crosslinkable monomer also includes monomer compounds having one propagation site.

15. The process of claim 1 wherein:

said second coating comprises between about 2 to about 50 weight percent of crosslinkable monomer.

16. The process of claim 1 including:

depositing plastisol in accordance with a silk-screen printing process to obtain relief.

17. The process of claim 7 including:

depositing said ink or extender via a technique selected from the group consisting of photogravure, silk screen and flexographic printing.

18. The process of claim 1 wherein:

said pre-gelling is carried out at a temperature of between about 100 to 160 degrees centigrade.

19. The process of claim 1 wherein:

said graining is carried out at a temperature of about 100 degrees centigrade and a pressure depending upon the amount of mattness to be effected.

20. The process of claim 4 wherein:

said expansion is carried out at about 200 degrees centigrade for between about one minute to about two minutes, 30 seconds.

21. The process of claim 1 wherein:
said pre-gelling and graining stages are carried out simultaneously using a heated graining roller.

22. The process of claim 1 including:
heating said synthetic covering via infrared radiation.

23. The process of claim 1 including:
enhancing said fluidization by use of a mechanical treatment.

24. The process of claim 23 wherein said mechanical treatment is selected from the group consisting of a smooth roller and a textured roller.

25. The process of claim 1 wherein:
at least two radiation initiators are utilized in the same or different polymeric coatings.

26. The process of claim 25 including:
triggering each radiation initiator via a physiochemical effect specific to each of said radiation initiators either directly or via a radiation energy transfer agent.

27. The process of claim 25 wherein:
the polymerization initiation energy provided by radiation in said first coating does not initiate polymerization in said other coatings.

28. The process of claim 26 wherein:
said radiation initiator is triggered by a physiochemical effect selected from the group consisting of X-rays, electron beam and gamma radiation.

29. The process of claim 26 wherein:
said radiation energy transfer agent triggers said radiation initiator in a hot oven.

30. The process of claim 1 wherein:
at least a portion of said support layer comprises a plastisol.

31. The process of claim 1 including:
depositing a transparent plastisol coating over said first and second polymeric coatings to act as a wear layer.

32. The synthetic covering derived from a process of obtaining areas of distinctive appearance on a synthetic covering, the covering including a support layer, including the steps of:
depositing at least a first polymeric coating having at least one radiation initiator therein onto a first selected [area] *zone* of said support layer;
depositing at least a second [polymeric] coating onto a second selected [area] *zone* of said support layer, at least a portion of said second [polymeric] coating comprising a crosslinkable monomer, *said deposited coatings defining a synthetic covering;*
pre-gelling said [deposited coatings] *synthetic covering;*
mechanically graining *at least* selected areas of said [deposited coatings] *synthetic covering* to form a matted surface;
polymerizing said [first polymeric coating] *synthetic covering in said first zone* via said radiation initiator wherein said [first polymeric coating] *synthetic covering in said first zone* is fixed to said support layer, and wherein said matted surface on said [first polymeric coating] *synthetic covering* is fixed thereon; and
gelling [said second polymeric coating] to cause fluidization of said [second polymeric coating] *synthetic covering which has not been fixed by initiation in said first zone* thereby smoothing said matted surface thereon.

33. The process of claim 1 including:
providing at least one radiation initiator to said second polymeric coating.

34. The process of claim 33 including:
triggering each radiation initiator in said polymeric coatings via a physiochemical effect specific to each of said radiation initiators either directly or via a radiation energy transfer agent.

35. The process of claim 33 wherein:
the polymerization initiation energy provided by radiation in said first coating does not initiate polymerization in said other coatings.

36. The process of claim 34 wherein:
said radiation initiators are triggered by a physiochemical effect selected from the group consisting of X-rays, electron beam and gamma radiation.

37. The process of claim 35 wherein:
said radiation initiators are of the same type.

*38. A process of obtaining areas of distinctive appearance on a synthetic covering, the covering including a support layer, including the steps of:*
*depositing at least a first polymeric coating having at least one radiation initiator therein onto a first selected zone of said support layer;*
*depositing at least a second coating onto a second selected zone of said support layer, said second zone covering at least a portion of said first zone, at least a portion of said second coating including a crosslinkable monomer, said deposited coatings defining a synthetic covering;*
*pre-gelling said synthetic covering;*
*mechanically graining at least selected areas of said synthetic covering to form a matted surface;*
*polymerizing said synthetic covering in said first zone via said radiation initiator wherein said synthetic covering in said first zone is fixed to said support layer, and wherein said matted surface on said synthetic covering is fixed thereon; and*
*gelling to cause fluidization of said synthetic covering which has not been fixed by initiation in said first zone thereby smoothing said matted surface thereon.*

*39. The synthetic covering derived from a process of obtaining areas of distinctive appearance on a synthetic covering, the covering including a support layer, including the steps of:*
*depositing at least a first polymeric coating having at least one radiation initiator thereon onto a first selected zone of said support layer;*
*depositing at least a second coating onto a second selected zone of said support layer, said second zone covering at least a portion of said first zone, at least a portion of said second coating including a crosslinkable monomer, said deposited coatings defining a synthetic covering;*
*pre-gelling said synthetic covering;*
*mechanically graining at least selected areas of said synthetic covering to form a matted surface;*
*polymerizing said synthetic covering in said first zone via said radiation initiator wherein said synthetic covering in said first zone is fixed to said support layer, and wherein said matted surface on said synthetic covering is fixed thereon; and*
*gelling to cause fluidization of said synthetic covering which has not been fixed by initiation in said first zone thereby smoothing said matted surface thereon.*

*40. A process of obtaining areas of distinctive appearance on a synthetic covering, the covering including a support layer, including the steps of:*

*depositing at least a first coating having at least one radiation initiator therein onto a first selected zone of said support layer, said first coating comprising an ink or extender;*

*depositing at least a second coating onto a second selected zone of said support layer, at least a portion of said second coating including a crosslinkable monomer, said deposited coatings defining a synthetic covering;*

*pre-gelling said synthetic covering;*

*mechanically graining at least selected areas of said synthetic covering to form a matted surface;*

*polymerizing said synthetic covering in said first zone via said radiation initiator wherein said synthetic covering in said first zone is fixed to said support layer, and wherein said matted surface on said synthetic covering is fixed thereon; and*

*gelling to cause fluidization of said synthetic covering which has not been fixed by initiation in said first zone thereby smoothing said matted surface thereon.*

*41. The synthetic covering derived from a process of obtaining areas of distinctive appearance on a synthetic covering, the covering including a support layer, including the steps of:*

*depositing at least a first coating having at least one radiation initiator therein onto a first selected zone of said support layer, said first coating comprising an ink or extender;*

*depositing at least a second coating onto a second selected zone of said support layer, at least a portion of said second coating including a crosslinkable monomer, said deposited coatings defining a synthetic covering;*

*pre-gelling said synthetic covering;*

*mechanically graining at least selected areas of said synthetic covering to form a matted surface;*

*polymerizing said synthetic covering in said first zone via said radiation initiator wherein said synthetic covering in said first zone is fixed to said support layer, and wherein said matted surface on said synthetic covering is fixed thereon; and*

*gelling to cause fluidization of said synthetic covering which has not been fixed by initiation in said first zone thereby smoothing said matted surface thereon.*

* * * * *